United States Patent

Grussmann

(10) Patent No.: US 10,240,485 B2
(45) Date of Patent: Mar. 26, 2019

(54) TURBINE HOUSING FOR AN EXHAUST GAS TURBOCHARGER

(71) Applicant: Benteler Automobiltechnik GmbH, Paderborn (DE)

(72) Inventor: Elmar Grussmann, Altenbeken-Buke (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 436 days.

(21) Appl. No.: 14/935,942

(22) Filed: Nov. 9, 2015

(65) Prior Publication Data

US 2016/0130979 A1 May 12, 2016

(30) Foreign Application Priority Data

Nov. 11, 2014 (DE) .................. 10 2014 116 445

(51) Int. Cl.
  *F01D 25/26* (2006.01)
  *F02B 37/00* (2006.01)
  (Continued)

(52) U.S. Cl.
  CPC ............. *F01D 25/26* (2013.01); *F01N 13/10* (2013.01); *F02B 37/00* (2013.01); *F02B 37/02* (2013.01);
  (Continued)

(58) Field of Classification Search
  CPC .......... F01D 25/26; F01N 13/10; F02B 37/02; F02B 37/00; Y02T 10/144;
  (Continued)

(56) References Cited

U.S. PATENT DOCUMENTS 6,945,046 B2* 9/2005 Allmang ................ F01D 9/026
                                                                 415/136
8,312,721 B2* 11/2012 Smatloch .............. F02B 37/004
                                                                 415/102
(Continued)

FOREIGN PATENT DOCUMENTS

DE       10022052      3/2001
DE     102008061687   12/2009
(Continued)

OTHER PUBLICATIONS

Eisenwerk Hasenclever & Sohn GMBH; http://www.hasenclever.com/gb/tech_werk_gb.html ; 2009.*
(Continued)

*Primary Examiner* — Eldon T Brockman
(74) *Attorney, Agent, or Firm* — Jacobson Holman, PLLC.

(57) ABSTRACT

The invention relates to a turbine housing (2) for an exhaust gas turbocharger. The turbine housing (2) comprises an outer housing (3) and an inner housing (4) as well as a bearing flange (5). The outer housing (3) is joined to the bearing flange (5). The inner housing (4) comprises a first shell component (7) and a second shell component (8), wherein said first shell component and said second shell component are made of different cast steel materials and are placed side by side in a transverse plane (QE), which is oriented transversely to the longitudinal axis (LA) of the turbine housing (2), and are joined to each other. The bearing flange (5) is a one-piece part, made of uniform material, of the first shell component (7).

7 Claims, 2 Drawing Sheets

Figure 1:
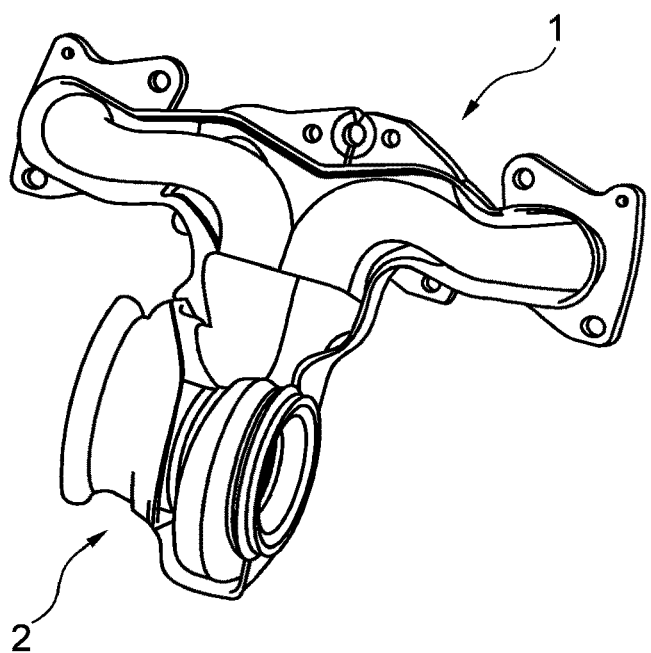

(51) Int. Cl.
*F01N 13/10* (2010.01)
*F02B 37/02* (2006.01)

(52) U.S. Cl.
CPC ...... *F05D 2220/40* (2013.01); *F05D 2230/21* (2013.01); *F05D 2230/232* (2013.01); *F05D 2240/14* (2013.01); *F05D 2240/50* (2013.01); *F05D 2300/171* (2013.01); *F05D 2300/176* (2013.01); *Y02T 10/144* (2013.01)

(58) Field of Classification Search
CPC ............. F05D 2240/50; F05D 2230/21; F05D 2300/176; F05D 2300/171; F05D 2240/14; F05D 2230/232; F05D 2220/40
See application file for complete search history.

(56) References Cited

U.S. PATENT DOCUMENTS

| | | | | |
|---|---|---|---|---|
| 8,667,679 | B2* | 3/2014 | Smatloch | B23P 15/00 29/445 |
| 8,827,635 | B2* | 9/2014 | Kratschmer | F01D 17/16 415/159 |
| 8,951,007 | B2* | 2/2015 | Botsch | F01D 25/246 415/158 |
| 9,447,698 | B2* | 9/2016 | Grussmann | F01D 25/243 |
| 9,581,045 | B2* | 2/2017 | Nagae | F01D 25/24 |
| 2003/0205047 | A1* | 11/2003 | Allmang | F01D 9/026 60/602 |
| 2011/0091318 | A1* | 4/2011 | Kratschmer | F01D 17/16 415/205 |
| 2011/0131985 | A1* | 6/2011 | Smatloch | F02B 37/004 60/614 |
| 2011/0318177 | A1* | 12/2011 | Botsch | F01D 25/246 415/208.1 |
| 2012/0102737 | A1* | 5/2012 | Smatloch | B23P 15/00 29/888.02 |
| 2013/0156567 | A1* | 6/2013 | Nagae | F01D 25/24 415/205 |
| 2013/0189093 | A1* | 7/2013 | Wade | F01D 9/026 415/204 |
| 2013/0302159 | A1* | 11/2013 | Grussmann | F01D 25/243 415/215.1 |

FOREIGN PATENT DOCUMENTS

| | | |
|---|---|---|
| DE | 102008032492 | 1/2010 |
| DE | 102008047448 | 3/2010 |
| DE | 102009007734 | 8/2010 |
| DE | 102009025054 | 12/2010 |
| DE | 102010005761 | 7/2011 |
| DE | 102010021114 | 11/2011 |
| DE | 102013200666 | 7/2013 |
| EP | 2299087 | 3/2011 |

OTHER PUBLICATIONS

Sellmer; "Neue Werkstoffe—Herausforderung fur die wirschaftliche Bearbeitun"; 2014; Weiner Produktionstechnik Kongress 2014; Germany (Year: 2014).*

* cited by examiner

TURBINE HOUSING FOR AN EXHAUST GAS TURBOCHARGER

The invention relates to a turbine housing for an exhaust gas turbocharger in accordance with the features disclosed in the preamble of patent claim 1.

Exhaust gas turbochargers increase the air flow through an engine by compressing the air required for combustion. Compared to naturally aspirated engines with the same displacement, the use of exhaust gas turbochargers increases the power and the torque as well as the efficiency. The exhaust gas turbocharger consists of a turbine and a compressor, where said exhaust gas turbocharger and the compressor are mounted on a common shaft and are statically connected to each other. The turbine or more specifically the turbine wheel is driven by the hot exhaust gas stream. The compressor wheel is also rotated by the static connection and compresses the inflowing fresh air. The temperature of the compressed air is cooled down by means of a charge air cooler, in order to reduce the volume and, as a result, to be able to convey more air or more specifically more oxygen into the combustion chamber. The use of exhaust gas turbochargers satisfies the objective of achieving not only a higher efficiency, but also predominantly a reduction in the amount of energy that is consumed as well as a reduction in the emission.

Due to DE 100 22 052 A1 a turbine housing for an exhaust gas turbocharger is already comprised in the prior art. This German patent suggests a decoupling of the exhaust gas conducting components and the supporting and/or sealing outer structures. The impeller housing or rather the inner housing is composed of two half shells and is surrounded by an outer housing, so that an air gap is produced between the two housings. The air gap acts as a thermal insulator and, in so doing, reduces the thermal radiation. A bearing flange is welded to the impeller housing and the outer housing.

Even in the case of the turbine housing, known from DE 10 2009 025 054 A1, there is an inner housing in an outer housing. The inner housing consists of two sheet metal shells, which are welded to each other on the outer periphery. The outer housing is welded to both a bearing flange as well as to an outlet flange.

DE 10 2010 021 114 A1 discloses a similar construction of the turbine housing. Both the outer housing as well as the inner housing are composed of two half shells. The outer housing is connected by material bonding to a hearing flange. The inner housing is coupled in a positive locking manner to the bearing flange.

In the scope of DE 10 2008 047 448 A1 an exhaust gas turbocharger is disclosed with a turbine housing as well as with a partial manifold, which is connected to the turbine housing, where in this case the turbine housing and the partial manifold are formed as a one-piece casting. An alternative provides that the turbine housing and the partial manifold are designed as separate castings, which can be connected to each other according to methods for manufacturing a casting. The measures that are proposed herein are to take into consideration that the connection between the thin walled, air gap insulated manifold and the comparatively thick walled cast turbine housing is problematic.

As stated above in the introduction, an exhaust gas turbocharger is driven by the exhaust gases of the engine. These exhaust gases are passed at a high speed and at high temperatures that sometimes exceed 1,000° C. to the turbine blades or rather the turbine wheel. As a result, the turbocharger is subject to high mechanical stresses and, in particular, maximum thermal stresses when the system is running. Due to the high thermal stresses the inner housing is often made of cast materials as one piece. The outer housing usually consists of formed sheet metal shells. These sheet metal shells are typically welded to the bearing flange by means of a welded joint; and the bearing flange is used to attach the exhaust gas turbocharger to a hearing housing of a turbine wheel. While the bearing housing is cooled in order to maintain the bearing arrangement and, thus, also the bearing flange is well cooled due to its direct contact with the bearing housing, a significant amount of heat is conducted into the bearing flange by means of the outer housing. The point of the highest temperature gradient inside the bearing flange is in the vicinity of the joint line to the sheet metal structure of the outer housing or the inner housing of the exhaust gas turbocharger. Consequently the bearing region on the side of the turbine wheel is under high stress. Owing to the variation in temperature while the system is running, bending moments occur in the region of attachment between the bearing flange and the outer shell, a feature that can have an adverse effect on the fatigue strength.

Therefore, the present invention is based on the problem of improving the thermal fatigue strength of a turbine housing, in particular, in the attachment region between the hearing flange and the outer shell.

The turbine housing of an exhaust gas turbocharger comprises an outer housing and an inner housing as well as a hearing flange. The outer housing is joined to the bearing flange, in particular, joined by material bonding by means of a welded or soldered joint. According to the invention, the inner housing comprises at least a first shell component and a second shell component. The first shell component is made of a cast steel material of the first type; and the second shell component is made of a cast steel material of the second type. Consequently the first shell component and the second shell component are made of cast steel materials that are different from each other. The two shell components are joined to each other.

The inner housing is divided into two separate shell components in a transverse plane that is oriented transversely to the longitudinal axis of the turbine housing. This measure makes it possible to compensate for the stresses occurring during operations by means of a suitable choice of material. As a result, the thermal fatigue strength of the turbine housing is increased. According to the invention, materials that have an enhanced or more specifically a higher thermal and dynamic strength are used for the highly stressed regions of the components. Since these materials are relatively expensive, in particular, because of their higher alloy content of nickel, niobium, titanium. or also tungsten, only the highly stressed region(s) of the inner housing is and/or are made of these materials. For the less stressed regions of the inner housing, the use of low alloy cast steel materials is possible. The two shell components are connected by a material-bonding joining operation, in particular, a laser or soldering operation, after a preceding mechanical processing of the parting plane. When selecting materials, preferably material combinations austenitic/austenitic or ferritic/ferritic should be selected. In this way it is possible to counteract the negative effects in the region of the joint by means of different coefficients of expansion.

The costs of the components can be reduced through the combination and choice of stress optimized materials. Impurities and/or surface defects of the inner surfaces are easier to detect, because the shell components can be inspected or rather checked inside and outside. The net result is that the reject costs are reduced. The same applies to damages to the turbochargers as such Finally it is also possible to reduce the component tolerances by means of a subsequent calibration process.

A particularly advantageous aspect of the invention provides that the bearing flange is a one-piece part, made of uniform material, of the first shell component. The bearing flange passes over into the wall of the first shell component. At the same time the thick walled part of the bearing flange decreases in the housing-sided wall section of the first shell component.

One advantageous embodiment provides in this context that the bearing flange has a connector section with an internal bearing receptacle.

The inner housing is divided in the longitudinal direction. The two shell components of the inner housing are placed side by side in a transverse plane, which is oriented transversely to the longitudinal axis of the turbine housing, and are connected to each other by means of a circumferential joint seam on the outer periphery of the inner housing.

The outer housing is joined to the bearing flange. For this purpose the bearing flange has an external circumferential web, by means of which the outer housing is joined to the bearing flange. Directly adjacent to the web there is a groove, with which the outer housing engages. The outer housing itself is formed by sheet metal shells. It is expedient for the outer housing to consist of an upper shell and a lower shell, where both the upper and the lower shell engage with the groove in such a way that they are situated opposite each other.

For the first shell component and the second shell component heat resistant cast steel materials are used. Both the cast steel material of the first shell component as well as the cast steel material of the second shell component have nickel as their alloy constituent. The nickel content in the cast steel material of the first shell component is significantly higher than the nickel content in the cast steel material of the second shell component. The ratio of the nickel content in the first shell component to the nickel content in the second shell component is calculated between 1.5:1 and 15:1. In other words, the cast steel material of the second shell component has a much lower nickel content than the first shell component. Correspondingly the cast steel material of the second shell component is much less expensive than the cast steel material of the first shell component.

The coefficients of linear thermal expansion of the two cast steel materials should match each other. In particular, in the range of the operating temperatures the difference in the coefficients of linear thermal expansion of the two cast steel materials is so small, that the stress in the region of the joint between the two shell components is as low as possible due to the different coefficients of expansion. In particular, the coefficient of linear thermal expansion of the cast steel material of the first shell component, measured at a temperature of 800° C., is between 1% and 10% less than the coefficient of linear thermal expansion of the cast steel material of the second shell component. The figures for the coefficient of linear thermal expansion are based on a finding according to the standard EN10295.

Preferably GX40NiCrSiNb38-19 hearing the material number 1.4849 is used for the first shell component of the heat resistant steel casting. The second shell component is made preferably of the heat resistant cast steel GX40CrNiSi25-12 having the material number 1.4837. The cast steel no. 1.4849 has a nickel content between 36.0% and 39.0%. The cast steel no. 1.4837 has a nickel content between 11.0% and 14%. Consequently the nickel content of 36% in the first shell component is reduced to 11% in the second shell component. The material no. 1.4849 also has a niobium content ranging from 1.20% to 1.80%, whereas the cast steel no. 1.4837 has no niobium or rather has an undetectable niobium content.

An additional advantageous combination of materials for the first shell component and the second shell component consists of the fact that the first shell component is made of the heat resistant cast steel GX40CiNiSi25-20 bearing the material number 1.4848, whereas the second shell component is made, as before, of the heat resistant cast steel GX40CrNiSi25-12 (no. 1.483). The cast steel no. 1.4848 has a nickel content between 19.0% and 22.0%. In contrast, the nickel content in the material of the second shell component is less and is between 5% and 11% below the nickel content in the first shell component.

The invention is described in greater detail below by means of the exemplary embodiments shown in the drawings. The drawings show in FIG. 1 a perspective view of an exhaust gas manifold of an internal combustion engine with an attached turbine housing of a downstream exhaust gas turbocharger.

Figure 2:
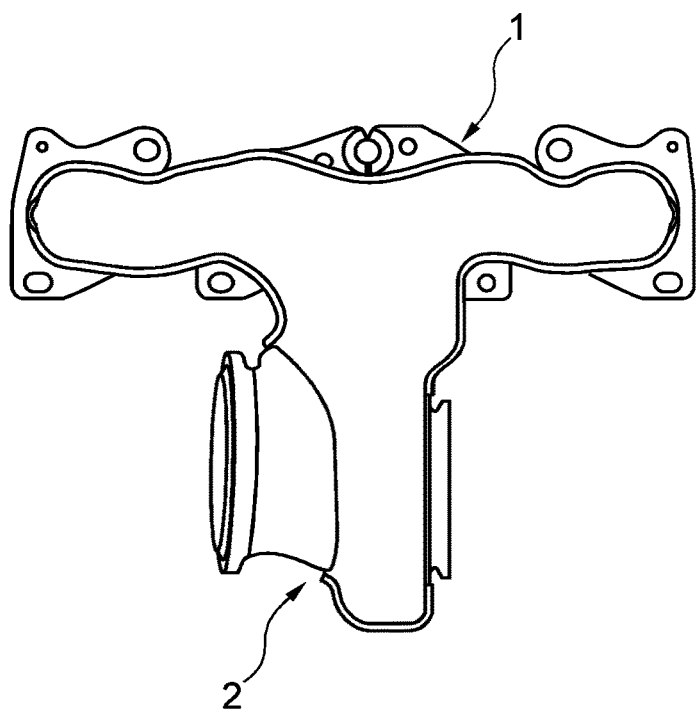

FIG. 2 the representation, according to FIG. 1, in a view.

Figure 3:
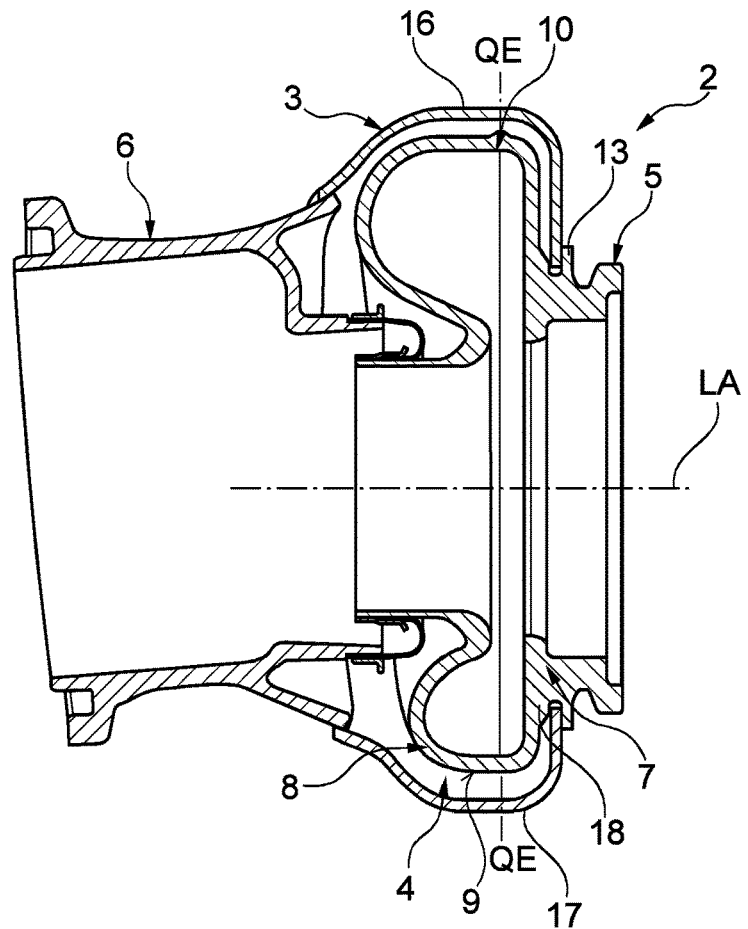

FIG. 3 a sectional view of the turbine housing; and

Figure 4:
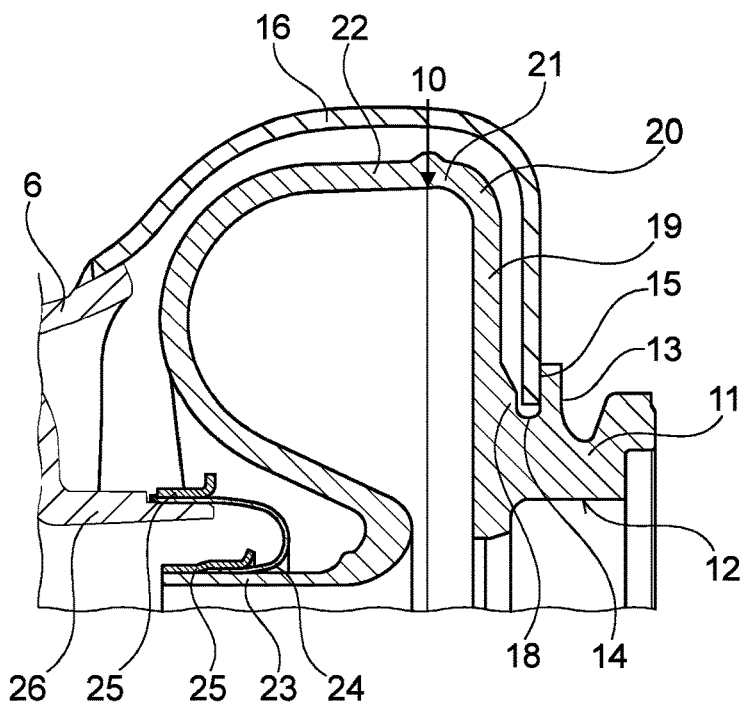

FIG. 4 an enlarged detail from the representation of the turbine housing from FIG. 3.

FIGS. 1 and 2 show an exhaust gas manifold 1 of an internal combustion engine with a turbine housing 2 of a downstream exhaust gas turbocharger.

The turbine housing 2 is explained in greater detail with reference to FIGS. 3 and 4.

The turbine housing 2 comprises an outer housing 3 and an inner housing 4. Furthermore, a bearing flange 5 as well as an outlet flange 6 are provided.

The inner housing 4 comprises a first shell component 7 and a second shell component 8. The first shell component 7 is made of a cast steel material of the first type, i.e. the heat resistant cast steel GX40NiCrSiNb38-19 (no. 1.4849). The second shell component 8 is made of a cast steel material of the second type, i.e. the heat resistant cast steel GX40CrNiSi25-12 (no. 1.4837). The two shell components 7, 8 are placed side by side in a transverse plane QE, which is oriented transversely to the longitudinal axis LA of the turbine housing 2, and are connected to each other by means of a circumferential joint seam 10 on the outer periphery 9 of the inner housing 4.

The bearing flange 5 is a one-piece part, made of uniform material, of the first shell component 7. The bearing flange 5 has a connector section 11, in which an internal bearing receptacle 12 is formed. The bearing receptacle 12 is used to receive a bearing for the shaft of the turbine wheel.

On the outside the bearing flange 5 has a circumferential web 13. A groove 14 is formed adjacent to the web 13. The outer housing 3 is connected by way of the web 13 to the bearing flange 5 by means of the material bonding joint 15, in particular by means of a laser welded seam or a soldered joint. The outer housing 3 itself comprises an upper shell 16 and a lower shell 17, where both the upper and the lower shell engage with the groove 14 in such a way that they are opposite each other and are joined to the web 13.

The joint region between the outer shell 3 and the bearing flange 5 is included in the highest stressed zones of the turbine housing 2. Here high bending moments occur as a result of the temperature changes. Owing to the use of the cast steel material no. 1.4849 with its nickel content of 36% to 39%, the highly stressed flange region exhibits an enhanced thermal and dynamic strength. As a result, the fatigue strength of the turbine housing 2 can be increased.

The cast steel material no. 1.4837 is significantly less alloyed with a nickel content of 11% to 14%. Consequently the second shell component 8, made of this cast steel material no. 1.4837, is more cost effective.

A radially oriented wall section 19 of the first shell component 7 adjoins the bearing flange 5 by way of a transition section 18. The wall section 19 passes over a curved section 20 into a crown section 21, which is oriented in the direction of the longitudinal axis LA of the turbine housing 2. With the crown section 21 the first shell component 7 is butt jointed to the outer edge section 22 of the second shell component 8 and is connected by material bonding to the said second shell component along the joint seam 10.

Furthermore, it can be seen that the outer housing 3 is connected to the outlet flange 6. The inner housing 4 has an outlet connector 23, which is connected to the receiving connector 26 by means of a sliding sleeve 24 and the clamping components 25, where said receiving connector is an integrated one-piece part, made of uniform material, of the outlet flange 6.

REFERENCE NUMERALS

1—exhaust gas manifold
2—turbine housing
3—outer housing
4—inner housing
5—bearing flange
6—outlet flange
7—first shell component
8—second shell component
9—outer periphery of 4
10—joint seam
11—connector section
12—bearing receptacle
13—web
14—groove
15—joint
16—upper shell
17—lower shell
18—transition section
19—wall section
20—curved section
21—crown section
22—edge section
23—outlet connector
24—sliding sleeve
25—clamping component
26—receiving connector
QE—transverse plane
LA—longitudinal axis of 2

The invention claimed is:

1. A turbine housing, which is designed for an exhaust gas turbocharger and which comprises an outer housing consisting of a high nickel content steel alloy and an inner housing consisting of lower nickel content steel alloy as well as a bearing flange, wherein the outer housing is joined to the bearing flange, the inner housing comprises a first shell component and a second shell component, said first shell component and said second shell component being joined to each other; and the two shell components being made of different cast nickel steel alloys; wherein the bearing flange is a unitary part, made of the same cast nickel steel alloy material as the first shell component; wherein the two shell components are placed side by side in a transverse plane (QE), which is oriented transverse to the longitudinal axis (LA) of the turbine housing, and are connected to each other by means of a circumferential joint seam on the outer periphery of the inner housing.

2. The turbine housing, as claimed in claim 1, wherein the bearing flange has an external circumferential web, by means of which the outer housing is joined to the bearing flange.

3. The turbine housing, as claimed in claim 1, wherein the bearing flange has a connector section with an internal bearing receptacle for housing and joining a to the outer housing.

4. The turbine housing, as claimed in claim 1, wherein the cast steel material of the first shell component containing nickel as its alloy constituent; and the cast steel material of the second shell component containing nickel as its alloy constituent have a ratio of the nickel content in the first shell component to the nickel content in the second shell component of between 1.5:1 and 15:1.

5. The turbine housing, as claimed in claim 1, wherein the coefficient of linear thermal expansion of the cast nickel steel alloy of the first shell component and the coefficient of linear thermal expansion of the cast nickel steel alloy of the second shell component, measured at a temperature of 800° C., correspond to each other with a deviation of ±10%.

6. The turbine housing, as claimed in claim 1, wherein the first shell component is made of the beat resistant cast nickel steel alloy
GX40NiCrSiNb 38-19 (no. 1.4849), and the second shell component is made of the heat resistant cast nickel steel alloy GX40CrNiSi 25-12 (no. 1.4837).

7. The turbine housing, as claimed in claim 1, wherein the first shell component is made of the heat resistant cast nickel steel alloy
GX40CrNiSi25-20 (no. 1.4848), and the second shell component is made of the heat resistant cast nickel steel alloy GX40CrNiSi25-12 (no. 1.4837).

* * * * *